United States Patent
Nagesh et al.

(10) Patent No.: US 12,537,383 B1
(45) Date of Patent: Jan. 27, 2026

(54) MICROGRID CONFIGURATION OPTIMIZATION FOR BATTERY AGNOSTIC SYSTEMS

(71) Applicant: Caterpillar Inc., Peoria, IL (US)

(72) Inventors: Sowmya Nagesh, Peoria, IL (US); Gregory Scott Hasler, Pekin, IL (US); Ronald Christopher Gayles, Peoria, IL (US); Ranjay Singh, Kanpur (IN); Manoj Kumar Bantupalli, Vizianagaram (IN)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/906,644

(22) Filed: Oct. 4, 2024

(51) Int. Cl.
*H02J 3/46* (2006.01)
*H02J 3/32* (2006.01)
*H02J 3/38* (2006.01)
*H02J 7/00* (2006.01)

(52) U.S. Cl.
CPC ....... *H02J 3/46* (2013.01); *H02J 3/32* (2013.01); *H02J 3/381* (2013.01); *H02J 7/0048* (2020.01); *H02J 7/00712* (2020.01); *H02J 2203/10* (2020.01); *H02J 2300/10* (2020.01); *H02J 2300/24* (2020.01); *H02J 2300/28* (2020.01); *H02J 2300/40* (2020.01)

(58) Field of Classification Search
CPC .... H02J 3/46; H02J 7/00; H02J 7/0048; H02J 7/00712; H02J 3/32; H02J 3/38; H02J 3/381; H02J 2300/28; H02J 2300/40; H02J 2300/10; H02J 2300/24
See application file for complete search history.

(56) References Cited

U.S. PATENT DOCUMENTS

| | | |
|---|---|---|
| 10,423,185 B2 | 9/2019 | Baone et al. |
| 10,998,732 B2 | 5/2021 | Reddy et al. |
| 11,742,668 B2 | 8/2023 | Bangalore et al. |
| 2017/0322578 A1 | 11/2017 | Baone et al. |
| 2020/0303925 A1 | 9/2020 | Reddy et al. |
| 2022/0140610 A1 | 5/2022 | Bangalore et al. |

FOREIGN PATENT DOCUMENTS

| | | |
|---|---|---|
| KR | 101704252 B1 | 2/2017 |
| KR | 101776618 B1 | 9/2017 |
| KR | 20180083487 A | 7/2018 |

*Primary Examiner* — Robert L Deberadinis
(74) *Attorney, Agent, or Firm* — Harrity & Harrity LLP

(57) ABSTRACT

A microgrid controller may measure a group state-of-charge (SOC) of a group of energy storage systems (ESSs), calculate a total real power demanded by a plurality of loads, determine an available real power for a group of renewable-energy-based (REB) energy resource systems, determine whether the available real power is greater than a sum of the total real power and an ESS parasitic consumption of the group of ESSs, and, based on the available real power being greater than the sum, generate first control signals for turning off a group of fuel-based (FB) energy resource systems or for maintaining the group of FB energy resource systems in an off-state, or, based on the available real power being less than or equal to the sum, generate second control signals for turning on the group of FB energy resource systems or for maintaining the group of FB energy resource systems in an on-state.

20 Claims, 5 Drawing Sheets

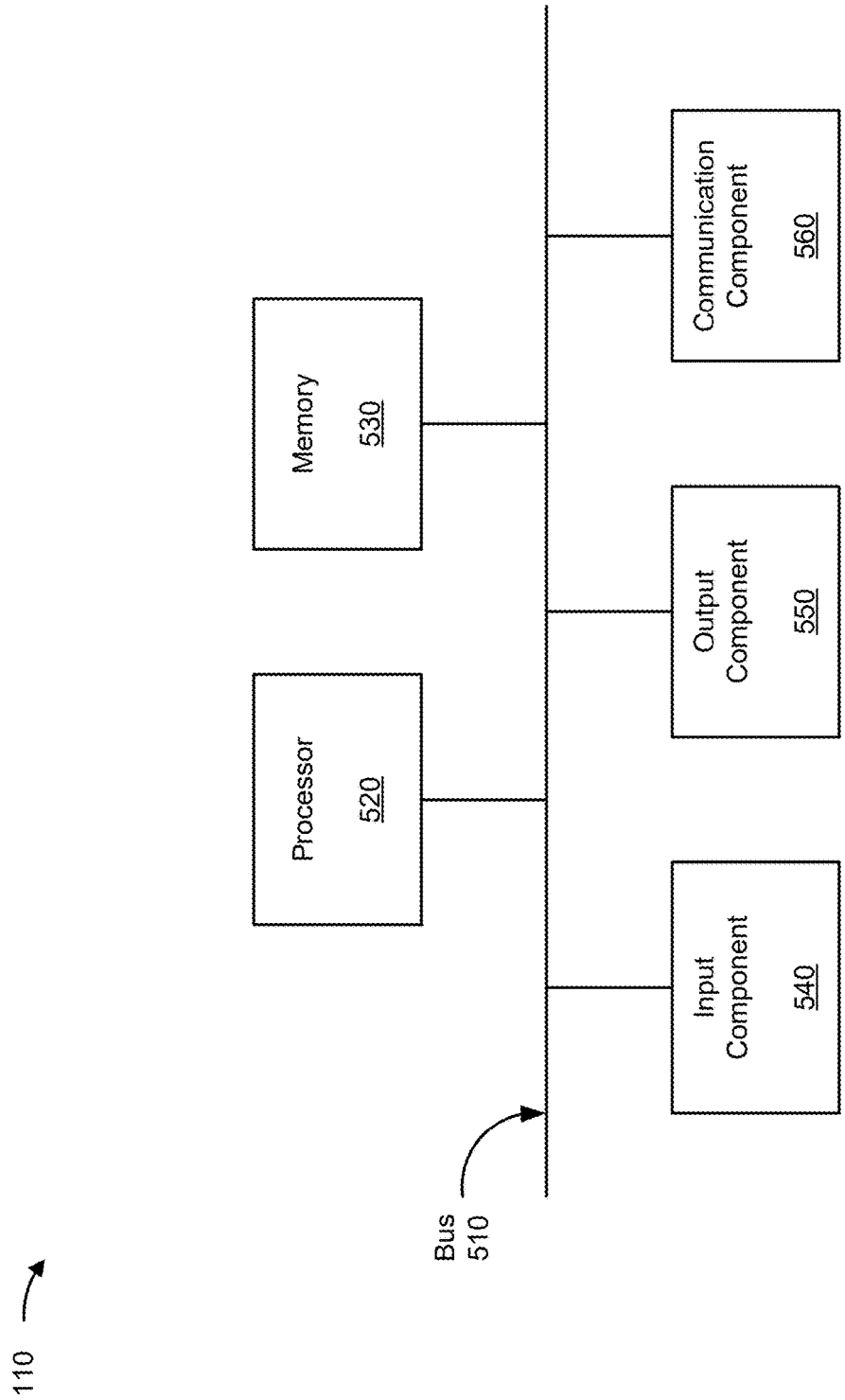

MICROGRID CONFIGURATION OPTIMIZATION FOR BATTERY AGNOSTIC SYSTEMS

TECHNICAL FIELD

The present disclosure relates generally to microgrids and, for example, to a microgrid controller configured to control or manage an operation of a microgrid.

BACKGROUND

A microgrid is a self-sufficient energy system that serves a particular geographic area, such as a college campus, a hospital complex, a business center, a neighborhood, a mining site, a drilling site, and/or the like. Within a microgrid are one or more kinds of distributed energy resources (DERs) (e.g., solar panels, wind turbines, fuel cells, photovoltaic (PV) cells, generators, energy storage devices (e.g., batteries, capacitors), and/or other energy sources) that produce power for the microgrid. Some microgrids are configured as off-grid electrical power distribution systems (e.g., stand-alone microgrids or islands) that do not connect to a larger electrical power distribution system (e.g., a macrogrid) run by, for example, an electric utility or power plant. Some microgrids are able to operate in a grid-connected mode and in a stand-alone mode. In a grid-connected mode, a microgrid may operate connected to and synchronous with the larger electrical power distribution system. In a stand-alone mode, the microgrid may be disconnected from the larger electrical power distribution system and operate as a stand-alone microgrid. A microgrid controller may control whether the microgrid operates in the grid-connected mode or in the stand-alone mode, for example, based on a schedule or based on one or more conditions being satisfied.

A microgrid may include different types of DERs, including non-renewable-fuel-based DERs (e.g., generator sets and some types of fuel cells), renewable-energy-based DERs (e.g., wind, hydro, and solar), and energy storage systems (ESSs) (e.g., batteries and capacitors). Many microgrid systems do not have an efficient way to optimize renewable-energy-based DERs, such that the microgrid controller has flexibility to turn on/off non-renewable-fuel-based DERs based on a real-time load and based on parasitics and an energy capacity of the energy storage systems.

U.S. Pat. No. 11,742,668 (the '668 patent) discloses a microgrid system that supports EV charging. The microgrid system powers a load with one or more renewable energy sources (e.g., solar, wind), battery storage, in combination with optional access to limited utility power and automatically-controlled generator power as a backup. The microgrid system can deliver clean uninterrupted power. The microgrid system includes a main storage sub-system and an optional secondary storage that may be brought online and increased or decreased as needed, and optimized based on guidance provided by the microgrid controller. The microgrid system also includes modules that decide how to optimally use the energy from the various sources, in order to maximize renewable energy usage, minimize the cost of electricity, while maximizing the life of the system.

However, the microgrid system disclosed by the '688 patent does not consider parasitics based on battery self-consumption and energy capacity of energy storage systems for determining whether to bring generator sets (i.e., gensets) online or for determining whether to turn off the generator sets. In addition, the microgrid system disclosed by the '688 patent does not provide a mode of operation where renewable energy sources are prioritized over non-renewable energy sources, such as generator sets, taking into account various condition checks, such as energy, power, reserve, and state-of-charge checks, especially with regard to self-consumption and parasitics of the energy storage systems.

The microgrid controller of the present disclosure solves one or more of the problems set forth above and/or other problems in the art.

SUMMARY

A microgrid controller of a microgrid may include a communication interface configured to receive load information corresponding to a plurality of loads connected to the microgrid, receive energy resource information corresponding to a plurality of energy resource systems configured to supply power to the microgrid, and output control signals for controlling an operation of each energy resource system of the plurality of energy resource systems, wherein the plurality of energy resource systems includes a group of fuel-based (FB) energy resource systems, a group of renewable-energy-based (REB) energy resource systems, and a group of energy storage systems (ESSs) configured to be charged and discharged; one or more memories configured to store an activation minimum state-of-charge (SOC) setpoint for the group of ESSs; and one or more processors, coupled to the one or more memories, configured to: measure a group SOC of the group of ESSs, calculate, based on the load information, a total real power demanded by the plurality of loads, determine an available real power for the group of REB energy resource systems, determine whether the available real power is greater than a sum of the total real power and an ESS parasitic consumption of the group of ESSs, and based on the available real power being greater than the sum, generate one or more first control signals for turning off the group of FB energy resource systems or for maintaining the group of FB energy resource systems in an off-state.

A microgrid controller of a microgrid may include a communication interface configured to receive load information corresponding to a plurality of loads connected to the microgrid, receive energy resource information corresponding to a plurality of energy resource systems configured to supply power to the microgrid, and output control signals for controlling an operation of each energy resource system of the plurality of energy resource systems, wherein the plurality of energy resource systems includes a group of FB energy resource systems, a group of REB energy resource systems, and a plurality of groups of ESSs configured to be charged and discharged; one or more memories configured to store a respective activation minimum SOC setpoint for each group of ESSs of the plurality of groups of ESSs; and one or more processors, coupled to the one or more memories, configured to: measure a group SOC for each group of ESSs, calculate, based on the load information, a total real power demanded by the plurality of loads, determine an available real power for the group of REB energy resource systems, determine whether the available real power is greater than a sum of the total real power and an ESS parasitic consumption of the plurality of groups of ESSs, and based on the available real power being greater than the sum, generate one or more first control signals for turning off the group of FB energy resource systems or for maintaining the group of FB energy resource systems in an off-state.

A control method may include receiving, by a microgrid controller of a microgrid, load information corresponding to a current load demand of a plurality of loads connected to the microgrid; receiving, by the microgrid controller, energy resource information corresponding to a plurality of energy resource systems configured to supply power to the microgrid, wherein the plurality of energy resource systems includes a group of FB energy resource systems, a group of REB energy resource systems, and a group of ESSs configured to be charged and discharged; and controlling, by the microgrid controller, the plurality of energy resource systems based on the load information, wherein controlling the plurality of energy resource systems includes: measuring a group SOC of the group of ESSs, calculating, based on the load information, a total real power demanded by the plurality of loads, determining an available real power for the group of REB energy resource systems, determining whether the available real power is greater than a sum of the total real power and an ESS parasitic consumption of the group of ESSs, and based on the available real power being greater than the sum, generating one or more first control signals for turning off the group of FB energy resource systems or for maintaining the group of FB energy resource systems in an off-state, or based on the available real power being less than or equal to the sum, generating one or more second control signals for turning on the group of FB energy resource systems or for maintaining the group of FB energy resource systems in an on-state.

BRIEF DESCRIPTION OF THE DRAWINGS

FIG. 5 is a diagram of example components of the microgrid controller associated with a microgrid configuration optimization for battery agnostic systems.

DETAILED DESCRIPTION

Figure 1:
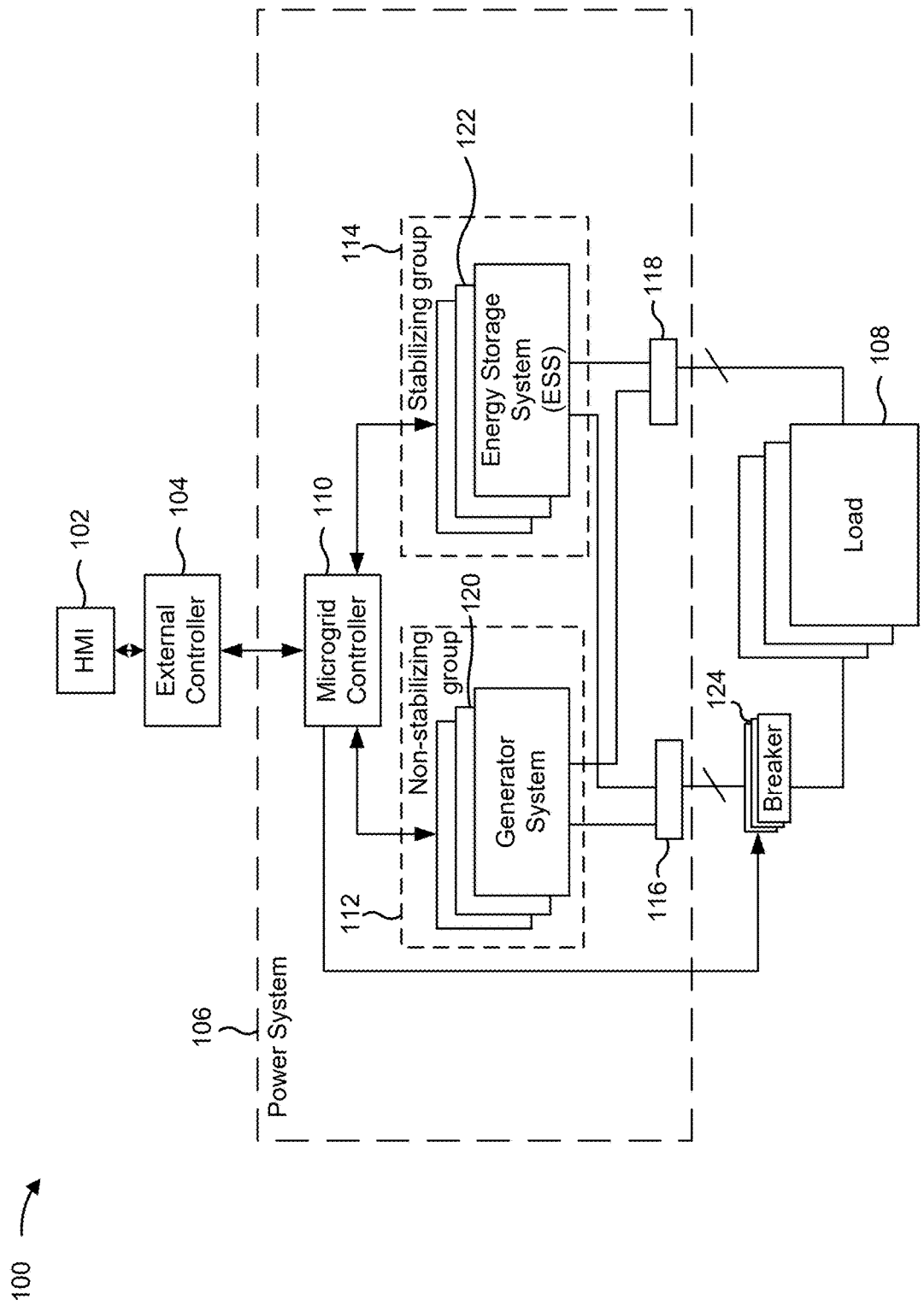
FIG. 1 shows a system according to one or more implementations.

This disclosure relates to a power distribution system, and is applicable to any system that distributes and/or receives power via a power grid. Some aspects relate to a microgrid controller that is configured to control one or more components and/or systems associated with the microgrid, including energy resource systems and/or loads. The microgrid controller may control a state of the microgrid based on one or more conditions being satisfied.

A power distribution system, such as a microgrid, may include different types of DERs, including non-renewable-fuel-based DERs (e.g., generator sets, some types of fuel cells, and other fuel-consuming DERs), renewable-energy-based DERs (e.g., wind, hydro, and solar), and energy storage systems (e.g., batteries and capacitors). Many microgrid systems do not have an efficient way to optimize renewable-energy-based DERs, such that the microgrid controller has flexibility to turn on/off non-renewable-fuel-based DERs in order to maximize a usage of the renewable-energy-based DERs. For example, many microgrid systems do not have an efficient way to optimize renewable-energy-based DERs, such that the microgrid controller has flexibility to turn on/off non-renewable-fuel-based DERs based on a real-time load and based on parasitics and energy capacities of the energy storage systems.

Some implementations provide a microgrid system in which energy generator systems are classified into renewable types (e.g., renewable-energy-based DERs) and non-renewable-fuel-consuming types (e.g., non-renewable-fuel-based DERs). The microgrid system may include a microgrid controller that may monitor a real-time load (e.g., a total real power demand) and an available real power capable of being provided by the renewable-energy-based DERs. The microgrid controller may determine whether the non-renewable-fuel-based DERs should be on or off based on the real-time load and the available real power of the renewable-energy-based DERs. Additionally, the microgrid controller may determine whether the non-renewable-fuel-based DERs should be on or off based on an ESS parasitic consumption of the energy storage systems.

The microgrid controller may perform one or more condition checks when determining whether the non-renewable-fuel-based DERs should be on or off. The one or more condition checks may include a power capacity check of all energy storage system groups; an energy calculation check to ensure a group of energy storage systems has a minimum energy content before turning off non-renewable-fuel-based DERs, an SOC calculation check for all available energy storage system groups, an energy storage system reserve check to cover a minimum reserve requirement for the microgrid before the non-renewable-fuel-based DERs can be turned off, and a minimum time check corresponding to a minimum amount of time that the non-renewable-fuel-based DERs are required to operate before being capable of being turned off. In some examples, all condition checks may be required to be passed before the non-renewable-fuel-based DERs can be turned off. For example, the non-renewable-fuel-based DERs may be turned on at any point at which the SOC calculation check fails.

For the SOC calculation check, the microgrid controller may take into account an energy capacity factor (ECF) associated with the energy storage systems for calculating the ESS parasitic consumption of the energy storage systems. The ECF may be based on parasitic loads and energy capacities of the energy storage systems. The ECF may provide a safety margin and not allow the non-renewable-fuel-based DERs to be turned off unless the SOC calculation check is satisfied.

In addition, the microgrid controller may be configured with an activation minimum SOC setpoint and/or an energy capacity setpoint used during the SOC calculation check as an SOC target. The activation minimum SOC setpoint and energy capacity setpoint may be configured or tuned by an operator by input via a human-machine interface (HMI). Additionally, a parasitic load with acceptable tolerance margins may be applied for the SOC calculation check. Additionally, the microgrid controller may be configured with a minimum energy content setpoint used during the energy calculation check, and a minimum reserve requirement setpoint for the ESS reserve check.

The ECF may provide a unique way to tamp down on/off oscillations of the non-renewable-fuel-based DERs, since the non-renewable-fuel-based DERs won't be brought online until one or more of the condition checks are not satisfied. Put another way, the non-renewable-fuel-based DERs may be turned off when all condition checks are satisfied, and may be turned on when one or more of the condition checks are not satisfied. Since the real-time load and the available real power of the renewable-energy-based DERs may change continuously or periodically, the microgrid controller may be configured to continuously or periodically monitor (measure) the real-time load and the available real power of the renewable-energy-based DERs, and continuously or periodically perform the condition checks based on the updated real-time load and the updated available real power of the renewable-energy-based DERs.

The ECF may be a value that is greater than one in order to establish a sufficient operating margin that efficiently enables the non-renewable-fuel-based DERs to be turned off when the renewable-energy-based DERs have sufficient available real power to satisfy the real-time load (e.g., the total real power demanded by the loads) and the ESS parasitic consumption of the energy storage systems. The ECF may be configured for different types of energy storage systems to account for different battery characteristics, such as different battery chemistries that have diverse charging efficiencies and parasitics. Different battery chemistries may include nickel manganese cobalt (NMC), lithium iron phosphate, lithium sulfur, and others. A different ECF may be configured for each battery chemistry. For example, the ECF may be 1.02 for an NMC battery chemistry, but is not limited thereto. Based on apparent power (e.g., kilovolt-amps (kVA)) calculations, the ECF is a physics-based efficiency factor that may maximize renewable DER consumption. In other words, the ECF is configured such that use of the available real power of the renewable-energy-based DERs is maximized. As a result, the energy storage systems may be grouped into different battery chemistry groups, with each energy storage system group being associated with a different ECF. Each condition check may be performed on each energy storage system group. A group SOC may be determined by the microgrid controller for each energy storage system group. In some implementations, the SOC calculation check may be performed for all available energy storage system groups. To pass the SOC calculation check, the group SOC of all energy storage system groups must be above a respective activation minimum SOC setpoint if a total estimated available real power from the renewable-energy-based DERs cannot carry the real-time load and the ESS parasitic consumption of all of the energy storage system groups. For example, the SOC calculation check may be performed by the microgrid controller according to the following conditions:

IF Σrenewable available real power>total real power+ΣESS Group RatedkW×ECF, THEN
    SOC calculation check=TRUE
ELSIF ESS Group SOC[i]≥activation minimum SOC setpoint[i], THEN
    SOC calculation check=TRUE
ELSE
    SOC calculation check=FALSE The term "ESS Group RatedkW×ECF" may be representative of an ESS parasitic consumption for an energy storage system group. Thus, the ESS parasitic consumption for an energy storage system group may include a group rated capacity (e.g., ESS Group RatedkW) for the energy storage system group multiplied by an ECF associated with the energy storage system group. When the SOC calculation check is TRUE, the non-renewable-fuel-based DERs may be turned off, or maintained in an off-state. On the other hand, when the SOC calculation check is FALSE, the non-renewable-fuel-based DERs may not be permitted to be in the off-state. In other words, when the SOC calculation check is FALSE, the non-renewable-fuel-based DERs may be maintained in an on-state, or may be required to be turned on, if in the off-state. Thus, the non-renewable-fuel-based DERs may be prevented from being off when the SOC calculation check is FALSE. The microgrid controller may generate start commands to turn on the renewable-fuel-based DERs, and may generate stop commands to turn off the renewable-fuel-based DERs.

FIG. 1 shows a system 100 according to one or more implementations. The system 100 may include a human-machine interface (HMI) 102, an external controller 104, a power system 106, and one or more loads 108.

The power system 106 may be a microgrid or other type of electrical power distribution system that may provide power to the one or more loads 108. In some cases, the power system 106 may be an off-grid electrical power distribution system. In some cases, the power system 106 may be configurable to operate in a grid-connected mode and in a stand-alone mode. The power system 106 may include a microgrid controller 110, a non-stabilizing group of energy resource systems 112 (e.g., a non-stabilizing group of DERs), a stabilizing group of energy resource systems 114 (e.g., a stabilizing group of DERs), and interfaces 116 and 118. Generally, "off-grid" may mean that the electrical power distribution system is not connected to a larger electrical power distribution system run by, for example, an electric utility or other large-scale electric power generation plant that serves electricity to a geographic area, campus, compound, etc. However, techniques disclosed herein may still be applied to electrical power distribution systems that are connected to larger electrical power distribution systems. For instance, the larger electrical power distribution systems may operate as a power source in a primary provider role or secondary provider role, while the power system 106 may operate as a power source in the other of the primary provider role or secondary provider role.

The non-stabilizing group of energy resource systems 112 may include one or more energy generator systems 120. Each energy generator system 120 may include a power generator (e.g., an engine-generator, a fuel cell, a PV cell, or other power generating system) and a local generator controller communicatively coupled to the microgrid controller 110. Thus, each energy generator system 120 may generate power from a respective power source. Furthermore, the non-stabilizing group of energy resource systems 112 may be further divided into fuel-based (FB) energy resource systems (e.g., non-renewable-fuel-based DERs) and renewable-energy-based (REB) energy resource systems (e.g., renewable-energy-based DERs). Each local generator controller may control how much power a respective power generator generates, control a rate of power distribution, and/or obtain status information corresponding to the respective power generator. Each local generator controller may be controlled by the microgrid controller 110.

The stabilizing group of energy resource systems 114 may include one or more energy storage systems (ESSs) 122. Each energy storage system 122 may include an electric storage device (e.g., one or more batteries and/or capacitors) and a local ESS controller communicatively coupled to the microgrid controller 110. Each local ESS controller may control a flow of power into or out of a respective electric storage device, including charging of the respective electric storage device and discharging of the respective electric storage device, control a rate of power flow, and/or obtain status information corresponding to the respective electric storage device, such as state-of-charge (SOC), state-of-health (SOH), discharge limit, and other device parameters. Each local ESS controller may be controlled by the microgrid controller 110.

The system 100 may also include one or more breakers 124 (e.g., distribution breakers or switches) that may be individually controlled by the microgrid controller 110 to connect a respective load 108 to the power system 106 or disconnect the respective load 108 from the power system 106. The one or more breakers 124 may be part of one or both interfaces 116 and 118.

The HMI 102 may include one or more processors, and may be configured to receive and process one or more inputs from a user, such as an operator. Additionally, the HMI 102 may be configured to provide one or more prompts or outputs to the user. Thus, the HMI 102 may be a user terminal configured to interact with a user to process information and/or commands provided by the user, provide information to the user (e.g., status information), and/or perform one or more tasks or functions in response to processing the information and/or commands provided by the user. The HMI 102 may be communicatively coupled to the external controller 104, which may be communicatively coupled to the microgrid controller 110. In some implementations, the HMI 102 may be communicatively coupled directly to the microgrid controller 110. The external controller 104 may send commands to and receive information from the microgrid controller 110. For example, the external controller 104 may send commands to the microgrid controller 110 based on information received from the HMI 102. Thus, the external controller 104 may be a user-commanded controller. The external controller 104 may be integrated with the HMI 102. The external controller 104 may be a controller of a larger electrical power distribution system (e.g., a macrogrid, a power generation plant, and/or electric utility provider).

The power system 106 may provide electrical power to the one or more loads 108. Generally, the power system 106 may provide alternating current (AC) power at a particular voltage and a particular current. The microgrid controller 110 may control one or more energy storage systems 122 to instantaneously inject power when power is needed by the power system 106 or instantaneously absorb surplus power generated by the power system 106. Accordingly, one of more electric storage devices of the energy storage systems 122 may act as a power consumer on one or more energy generator systems 120 or as a power source for the one or more energy generator systems 120, to thereby ensure that system bus frequencies of the non-stabilizing group of energy resource systems 112 are maintained at a nominal value. In other words, the microgrid controller 110 may control the stabilizing group of energy resource systems 114 to stabilize loads of the non-stabilizing group of energy resource systems 112 in order to maintain the non-stabilizing group of energy resource systems 112 at a relatively constant load, which may reduce a recurrence of frequency deviations from the nominal value.

The microgrid controller 110 may be integrated with, or separate from (but connected to), the interfaces 116 and 118, the energy generator systems 120, and the energy storage systems 122, or combinations thereof. In this manner, a user may, through interaction with the HMI 102, add or remove energy generator systems 120 to increase/reduce system power generation and/or add or remove energy storage systems 122 to increase/reduce system energy storage capacity, in accordance with a user's preference. For instance, a user may prefer to add additional energy generator systems 120 and/or add additional energy storage systems 122 to increase load capacity if additional loads 108 are expected to be connected to the power system 106, or remove energy generator systems 120 and/or remove energy storage systems 122 to decrease load capacity if loads 108 are expected to be disconnected from the power system 106. Additionally, the microgrid controller 110 may be configured to add or remove energy generator systems 120 and/or add or remove energy storage systems 122 from the power system 106 based one or more conditions being satisfied. In some cases, the microgrid controller 110 may be configured to add or remove energy generator systems 120 and/or add or remove energy storage systems 122 from the power system 106 based on a schedule.

The one or more loads 108 may be any device that can connect to a power distribution system, such as the power system 106, to receive electrical power. Examples of loads may include heavy machinery (e.g., electric mining machines, haulers, etc.), personal devices, appliances, heating, ventilation, and air conditioning (HVAC) systems, industrial drills, personal residence electrical distribution systems, etc. The loads 108 may include one or more non-stable loads, such as one or more cyclic loads. The loads 108 may include unidirectional loads (e.g., loads that can only receive power from the power system 106), bi-directional loads (e.g., loads that can both receive power from the power system 106 and provide power to the power system 106), charging loads (e.g., loads that include a chargeable electric battery), essential loads (e.g., loads that require uninterrupted service), and/or non-essential loads (e.g., loads that do not require uninterrupted service). Loads may be assigned different priorities based on load type, load classification, and/or operation state or mode.

Generally, the one or more loads 108 may receive the power from the power system 106 and use the power in accordance with the operations of the one or more loads 108. Users of the power system 106 and the one or more loads 108 may connect/disconnect the one or more loads 108 by electrically connecting the one or more loads 108 to the interfaces 116 and 118 of the power system 106. For instance, the interfaces 116 and 118 may have AC plugs/sockets to connect the one or more loads 108 in parallel to the one or more energy generator systems 120 and the one or more energy storage systems 122 of the power system 106. One or more loads 108 may include a local load controller that may collect load information and transmit the load information to the microgrid controller 110. Load information may include information indicating a load type, a load classification, and/or an operation state or mode of a load 108. The loads can be active (real) or reactive to allow for a power quality-based approach to scheduling. Load information may include load data of a load, such as maximum load and minimum load. For chargeable loads, load information may include maximum charging load, maximum state of charge, minimum state of charge, current state of charge, and usable discharge energy as a function of the current state of charge. Load information may be received by the microgrid controller 110 via the interfaces 116 and 118, which may include one or more communication interfaces coupled to the microgrid controller 110.

The interfaces 116 and 118 may also have a plurality of generator connections and a plurality of energy store connections. The plurality of generator connections may be hardwired electrical connections and/or AC plugs/sockets to connect the one or more energy generator systems 120 in parallel to the at least one load 108 and the one or more energy storage systems 122. The plurality of energy store connections may be hardwired electrical connections and/or AC plugs/sockets to connect the one or more energy storage systems 122 in parallel to the one or more loads 108 and the one or more energy generator systems 120. For instance, the power system 106 may or may not allow addition/removal of energy generator systems 120 and/or addition/removal of energy storage systems 122. Therefore, depending on a configuration, the interfaces 116 and 118 may include: (1) hardwired electrical connections that connect the at least one energy generator system 120; (2) AC plugs/sockets to connect/disconnect the at least one energy generator system 120; (3) hardwired electrical connections that connect the at least one energy storage system 122; and/or (4) AC plugs/sockets to connect/disconnect the at least one energy storage system 122. The interfaces 116 and 118 may be coupled to a system bus (e.g., a power bus) of the power system 106. The system bus may enable one of more of the energy storage systems 122 to absorb power from one or more energy generator systems 120 and/or one or more loads 108 (e.g., for charging and/or storing power).

The one or more energy generator systems 120 may also include communication interfaces. The communication interfaces of the one or more energy generator systems 120 may enable the one or more energy generator systems 120 to communicate with the microgrid controller 110. For instance, the one or more energy generator systems 120 may be connected to the microgrid controller 110 by wired or wireless communication. The one or more energy generator systems 120 may provide the microgrid controller 110 with generator data (e.g., energy resource information). The generator data, for each of the one or more energy generator systems 120, may include load data and/or generator parameters. The load data may include a current (e.g., instantaneous) load seen by the one or more energy generator systems 120 and/or past load data (if one or more energy generator systems 120 store such data locally). The current load/past load data may include voltage (e.g., in volts) and/or current (e.g., in amperes) measured by one or more sensor components included in an energy generator system 120. The generator parameters may include a generator set maximum threshold value and a generator set minimum threshold value. Alternatively, to reduce transmission bandwidth, the generator data may omit the generator parameters, and the one or more energy generator systems 120 may transmit the generator parameters during an initial configuration process between the one or more energy generator systems 120 and the microgrid controller 110. The generator set maximum threshold value and the generator set minimum threshold value may indicate a maximum power load and a minimum power load, respectively, that a generator of an energy generator system 120 may support.

The one or more energy storage systems 122 may be any energy storage device that can store and output AC power. For instance, the one or more energy storage systems 122 may include at least one electrical-chemical energy storage (e.g., a battery), electrical energy storage (e.g., a capacitor, a supercapacitor, or a superconducting magnetic energy storage), mechanical energy storage (e.g., a fly wheel, a pump system), and/or any combination thereof. The one or more energy storage systems 122 may include inverters (individually or collectively) so that the one or more energy storage systems 122 may operate as a power consumer or a power source. The one or more energy storage systems 122 may also include electronic control mechanisms to control (1) how much load the one or more energy storage systems 122 draw, or (2) how much AC power the one or more energy storage systems 122 output.

The one or more energy storage systems 122 may also include communication interfaces. The communication interfaces of the one or more energy generator systems 120 may enable the one or more energy storage systems 122 to communicate with the microgrid controller 110. For instance, the one or more energy storage systems 122 may be connected to the microgrid controller 110 by wired or wireless communication. The one or more energy storage systems 122 may provide the microgrid controller 110 with energy storage data (e.g., energy resource information) and may receive instructions from the microgrid controller 110.

The energy storage data may include, for each of the at least one energy store, a current energy level (e.g., kilowatt-hours currently stored), total energy storage capacity (e.g., kilowatt-hours of capacity), and/or discharge/charge parameters. The current energy level may be measured by a battery meter of an energy storage. The battery meter may one or combinations of a voltmeter, an amp-hour meter, and/or an impedance-based meter. The discharge/charge parameters may indicate an amount of discharge power and an amount of charge power for a respective energy storage device of the one or more energy storage systems 122. Alternatively, to reduce transmission bandwidth, the energy storage data may omit the discharge/charge parameters, and the one or more energy storage systems 122 may transmit the discharge/charge parameters when the one or more energy storage systems 122 are first connected to the microgrid controller 110.

The one or more energy storage systems 122 may receive requests (e.g., instructions) for the energy storage data to provide the energy storage data and/or continuously provide the energy storage data to the microgrid controller 110. The instructions may include energy storage dispatch (ESD) instructions. An ESD instruction may include an instruction to inject power to a system bus of the power system 106 or absorb power from the system bus of the power system 106. ESD instructions may be provided in control signals (e.g., communication signals that provide the ESD instructions). At least one ESD instruction may be utilized to rapidly stabilize the load, thereby stabilizing the bus frequency of the power system 106 in a time efficient manner, rather than attempting to stabilize the load using the one or more energy generator systems 120 alone. The one or more energy storage systems 122 may control the inverters and the electronic control mechanisms to control (1) quantity of load drawn by the one or more energy storage systems 122, or (2) the amount of AC power output produced by the one or more energy storage systems 122, in accordance with the ESD instructions. Reactive and/or active may be used as a qualifier for loads, where reactive loads may contribute to a stabilization algorithm in addition to the active or real loads.

The microgrid controller 110 may include at least one memory device (e.g., one or more memories) for storing instructions (e.g., program code); at least one processor for executing the instructions from the memory device to perform a set of desired operations; and a communication interface (e.g., coupled to a communication bus) for facilitating the communication between various system components. The instructions may be computer-readable instructions for executing a control application. The communication interface of the microgrid controller 110 may enable the microgrid controller 110 to communicate with the one or more energy generator systems 120 and the one or more energy storage systems 122. The microgrid controller 110, while executing the control application, may receive the generator data and the energy storage data (e.g., energy resource information), process the generator data and the energy storage data to generate one or more ESD instructions, and output the ESD instructions to one or more energy generator systems 120 and/or to one or more energy storage systems 122.

To process the generator data and the energy storage data to generate the ESD instructions, the control application may include a load stabilization function and/or an SOC function. The control application may also include a generator set limit function and/or energy store discharge/charge limit function to generate the ESD instruction. In some cases, the load stabilization function may be activated while the power system 106 is configured in stand-alone mode in order to provide off-grid load stabilization. The microgrid controller 110 may automatically activate or deactivate the aforementioned system functions based on a presence or an absence of system parameters (such as no generator set minimum threshold value being available, etc.) or one or more system conditions being satisfied.

Generally, the load stabilization function may ensure that system bus frequencies of the one or more energy generator systems 120 are maintained at a nominal value by causing an amount of power to be absorbed/injected by the one or more energy storage systems 122. The amount of power may be determined based on a difference from an instantaneous load and a moving average of the load. Meanwhile, the SOC function may ensure that the one or more energy storage systems 122 are charged to a target SOC or a target SOC range such that a SOC of one or more energy storage systems does not drift too low or too high, outside of a desired operating range (e.g., the target SOC range). The target SOC or the target SOC range may enable the at least one energy storage system 122 to provide long term beneficial use to the system 100, such as having a range of operation usable by the power system 106 and/or avoid degradation ranges of the one or more energy storage systems 122.

One or more energy generator systems 120 may include an engine-generator (e.g., a genset) that provides AC power to the power system 106, which may provide the AC power to the at least one load 108. Generally, an engine-generator may be any device that converts motive power (mechanical energy) into electrical power to output the AC power. An engine-generator may be a gas turbine electrical generator. In such gas turbine electrical generators, fast changes in load from the at least one load 108 may cause a system bus frequency to deviate from a nominal value. The system bus frequency may be a frequency of electrical components of the generator. For instance, such gas turbine electrical generators may have isochronous frequency control governors that may try to maintain the system bus frequency to the nominal value in response to changes of the load of the one or more loads 108. Therefore, during a transient load charge (e.g., a load transient), the system bus frequency may change as the load on the engine-generator changes. However, a rate of return of the system bus frequency back to the nominal value is slower than a desired rate due to an inertia of motion of physical components (e.g., a rotor of a stator-rotor) of the engine-generator. The slow rate of return may reduce power quality of the power system 106. The power quality of the power system 106 may be determined based on the voltage, frequency, and waveform of the power output to the one or more loads 108. A high power quality may ensure continuity of service for the one or more loads 108, such that the one or more loads 108 are able to properly function as intended. A low power quality may cause the one or more loads 108 to malfunction, fail prematurely, or not operate at all.

Therefore, avoiding load transients may be beneficial in providing better power quality. However, generally, controlling a load of the one or more loads 108 may not be possible or desirable. Instead, the microgrid controller 110 may control the one or more energy storage systems 122 of the stabilizing group of energy resource systems 114 to act as a power consumer or as an energy source, so that the one or more energy generator systems 120 of the non-stabilizing group of energy resource systems 112 may maintain the system bus frequency at the nominal value, thereby ensuring better power quality.

Figure 2:
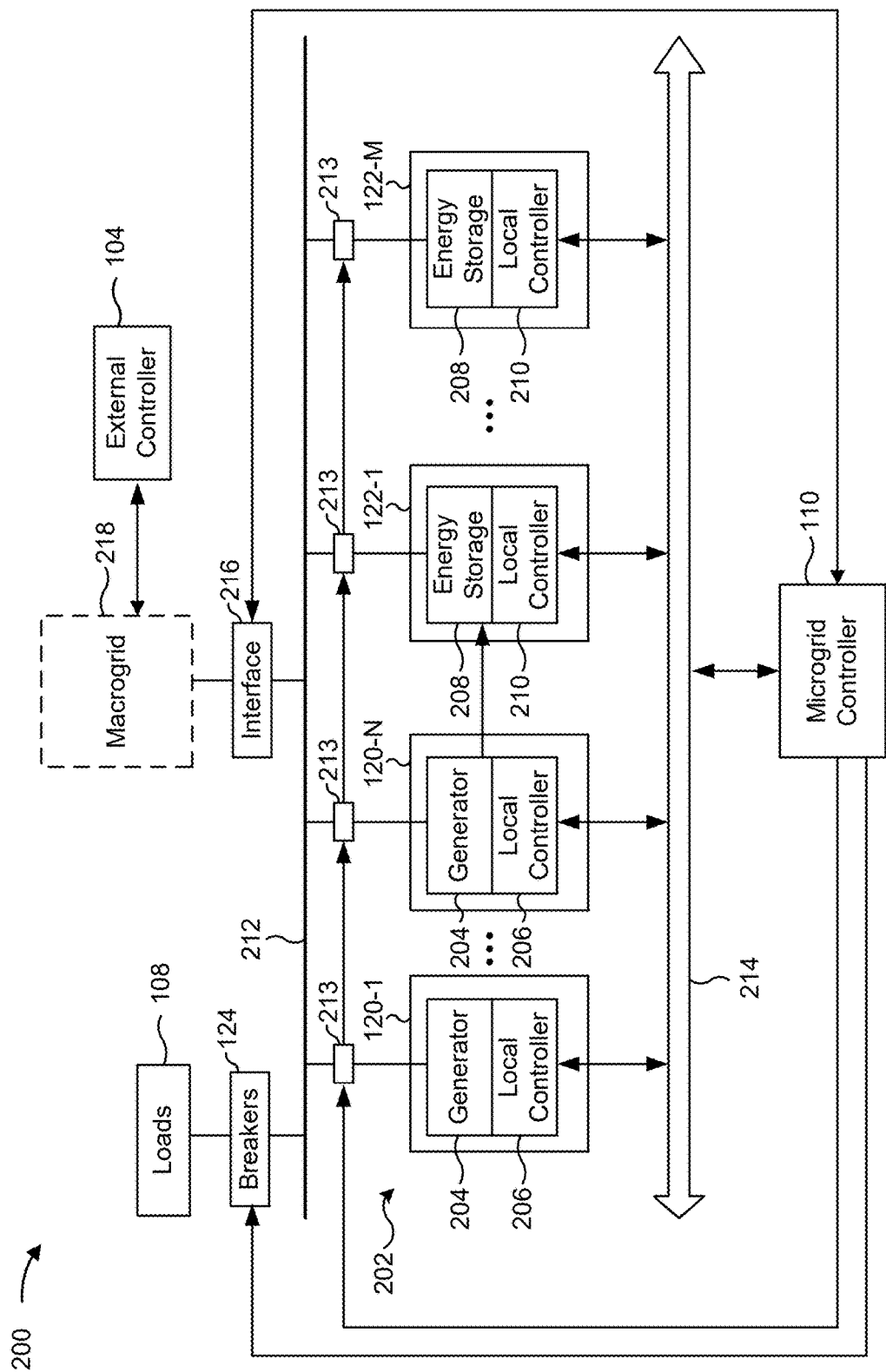
FIG. 2 shows a microgrid according to one or more implementations.

FIG. 2 shows a microgrid 200 according to one or more implementations. The microgrid 200 may be an example of the power system 106 described in connection with FIG. 1. The microgrid 200 may include a plurality of DERs 202. The plurality of DERs 202 may include N energy generator systems 120 and M energy storage systems 122, where N and M are integers greater than zero. For example, the plurality of DERs 202 may include a first energy generator system 120-1 and an Nth energy generator system 120-N. Additionally, the plurality of DERs 202 may include a first energy storage system 122-1 and an $M^{th}$ energy storage system 122-M. Each energy generator system 120 may include a power generator 204 and a local generator controller 206. Each energy storage system 122 may include an electric storage device 208 (e.g., one or more batteries and/or capacitors) and a local ESS controller 210.

Each energy generator system 120 may be coupled to a power bus 212 for providing power to one or more loads connected to the power bus 212. Additionally, each energy storage system 122 may be coupled to the power bus 212 for providing power to or absorbing power from the power bus 212 (e.g., for providing power to or absorbing power from one or more components, such as one or more loads and/or one or more energy generator systems 120 connected to the power bus 212).

The microgrid 200 may also include the microgrid controller 110 that is communicatively coupled to the local controllers (e.g., local generator controllers 206 and local ESS controllers 210) of each DER 202 across a communication bus 214. The communication bus 214 may also enable the microgrid 200 to communicate with one or more loads and/or one or more load management systems (e.g., charging systems, fleet management systems, local load controllers, etc.). In some cases, two or more communication buses 214 may be provided. For example, one communication bus may be provided to communicate with local controllers and another communication bus may be provided to communicate with one or more loads and/or one or more load management systems.

Each local generator controller 206 may include any appropriate hardware, software, and/or firmware to sense and control a respective power generator 204, and send information to, and receive information, from microgrid controller 110. For example, a local generator controller 206 may be configured to sense, determine, and/or store generator data of its respective power generator 204. The generator data may be sensed, determined, and/or stored in any conventional manner. Each local generator controller 206 may control whether a respective power generator 204 is connected to or disconnected from the power bus 212 (for example, based on an instruction or a control signal received from the microgrid controller 110).

Each local ESS controller 210 may include any appropriate hardware, software, and/or firmware to sense and control a respective electric storage device 208, and send information to, and receive information, from microgrid controller 110. For example, a local ESS controller 210 may be configured to sense, determine, and/or store various characteristics of its respective electric storage device 208. Such characteristics of the respective electric storage device 208 may include, among others, a current SOC, a current energy, an SOC minimum threshold, an SOC maximum threshold, and a discharge limit of the respective electric storage device 208. These characteristics of each respective electric storage device 208 may be sensed, determined, and/or stored in any conventional manner. Each local ESS controller 210 may control whether a respective electric storage device 208 is connected to or disconnected from the power bus 212 (for example, based on an instruction or a control signal received from the microgrid controller 110).

The microgrid controller 110 may receive or determine a need for charging or discharging of power from the microgrid 200, and may be configured to determine and send signals to allocate a total charge request and/or total discharge request across all of the plurality of DERs 202.

When performing the power allocation functions, the microgrid controller 110 may allocate a certain amount of power from each energy generator system 120 to one or more loads 108. The one or more loads 108 may be connected to the power bus 212 via one or more breakers 124 to receive power from the power bus. When performing the power allocation functions, the microgrid controller 110 may allocate a total charge request and/or a total discharge request across the energy storage systems 122 as a function of a usable energy capacity of each energy storage system 122. The usable energy capacity corresponds to the capacity or amount of energy that an energy storage system 122 can receive in response to a total charging request (usable charge energy), or the capacity or amount of energy that an energy storage system can discharge in response to a total discharge request (usable discharge energy). The usable charge energy is a function of a maximum state of charge, current state of charge, and current energy of the energy storage system, and the usable discharge energy is a function of a minimum state of charge, and current energy of the energy storage system 122. The microgrid controller 110 may determine a usable charge/discharge capacity of each energy storage system 122 (e.g., SOC), a desired charge/discharge of each energy storage system 122, a remainder power of each energy storage system 122, and/or an SOH of each energy storage system 122.

Thus, the microgrid controller 110 regulates a power supply of the microgrid 200 such that an exact amount of desired power flows into or out of the power system 106 at any given time. The microgrid controller 110 may regulate the power supply of the microgrid 200 in cooperation with the local generator controllers 206 and the local ESS controllers 210. The microgrid controller 110 may transmit control signals (e.g., instructions) to the local generator controllers 206 and the local ESS controllers 210 to activate (e.g., to bring online), deactivate (to bring offline), or curtail (limit or regulate to a target output) one or more of the DERs 202. Additionally, or alternatively, the microgrid controller 110 may transmit control signals to one or more switches 213 to control a switch state (e.g., an on state or an off state) of the one or more switches 213, for example, to connect one or more DERs 202 to or disconnect one or more DERs 202 from the microgrid 200 (e.g., the power bus 212). The switches 213 may be integrated in one or both interfaces 116 and 118 described in connection with FIG. 1.

In some cases, two or more power buses 212 may be provided. For example, a power bus may be provided to couple one or more power generators 204 to one or more electric storage devices 208 for charging the one or more electric storage devices 208. For example, the microgrid controller 110 may selectively couple a power generator 204 to an electric storage device 208 to charge the electric storage device 208. Thus, the power bus 212 may be part of a power distribution network of the microgrid 200 that may include one or more power buses used to distribute power between loads 108 and/or DERs 202.

The microgrid 200 may include an interface 216 for connecting the microgrid 200 to and disconnecting the microgrid 200 from an electrical power distribution system 218, such as a macrogrid. The electrical power distribution system 218 may include the external controller 104 (e.g., a macrogrid controller), as described in connection with FIG. 1. The external controller 104 may be coupled to the interface 216 for transmitting control signals, such as instructions or requests, to the microgrid controller 110. The interface 216 may include one or more electrical connections used for connecting the microgrid 200 to the electrical power distribution system 218. The interface 216 may include one or more switches or breakers that are controlled by the microgrid controller 110 for connecting the microgrid 200 to and disconnecting the microgrid 200 from the electrical power distribution system 218. For example, the one or more switches or breakers of the interface 216 may connect the power bus 212 (or another system bus) to or disconnect the power bus 212 (or another system bus) from the electrical power distribution system 218. Thus, the microgrid controller 110 may configure the microgrid 200 to operate in a grid-connected mode by connecting the microgrid 200 to the electrical power distribution system 218 or in a stand-alone mode by disconnecting the microgrid 200 from the electrical power distribution system 218.

Figure 3:
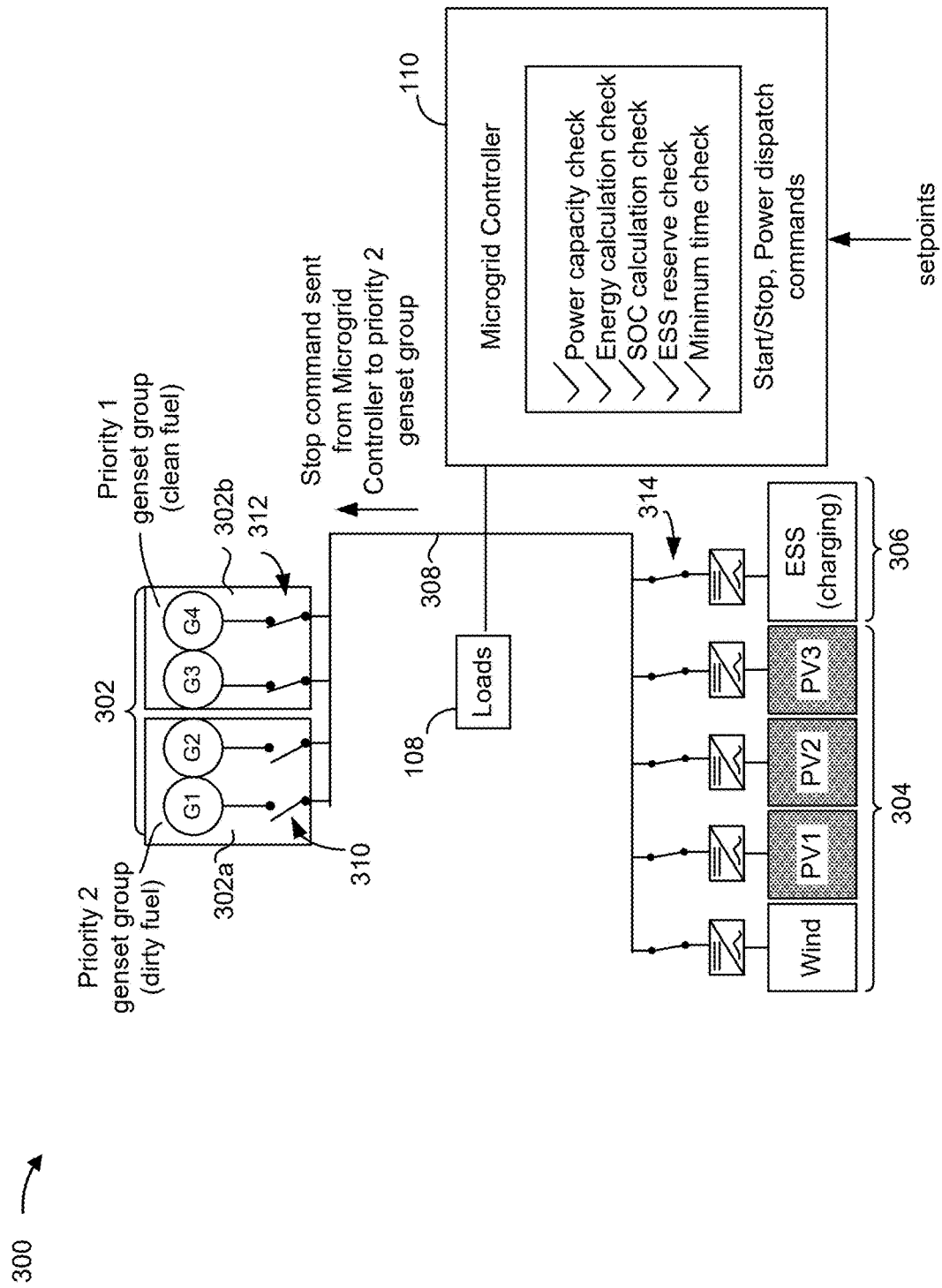
FIG. 3 shows a microgrid according to one or more implementations.

FIG. 3 shows a microgrid 300 according to one or more implementations. The microgrid 300 may be an example of the power system 106 described in connection with FIG. 1 and may be similar to the microgrid 200 described in connection with FIG. 2.

The microgrid 300 may include a plurality of energy resource systems that includes a group of FB energy resource systems 302, a group of REB energy resource systems 304, and a group of ESSs 306 configured to be charged and discharged. The group of FB energy resource systems 302 may include non-renewable-fuel-based DERs, and the group of REB energy resource systems 304 may include renewable-energy-based DERs. The group of FB energy resource systems 302 may be further divided into priority groups that include a priority 2 genset group 302a and a priority 1 genset group 302b. The plurality of energy resource systems may be coupled to the microgrid controller 110 by one or more buses 308. The one or more buses 308 may include at least one communication bus for communication between the plurality of energy resource systems and the microgrid controller 110, and at least one power bus for delivering power from the plurality of energy resource systems to loads 108. For example, the microgrid controller 110 may receive energy resource information from the plurality of energy resource systems over the at least one communication bus. In addition, the at least one communication bus may enable communications between the microgrid controller 110 and the loads 108. For example, the microgrid controller 110 may receive load information from the loads 108 over the at least one communication bus. The microgrid controller 110 may provide control signals, such as start and stop commands, over the one or more buses 308 to switches 310, 312, and/or 314 for controlling an operating state (e.g., an on-state or an off-state) of the group of FB energy resource systems 302, the group of REB energy resource systems 304, and the group of ESSs 306, respectively. In the example shown in FIG. 3, the group of REB energy resource systems 304 may include a wind turbine energy resource system and a plurality of PV energy resource systems PV1, PV2, and PV3. In some examples, a plurality of groups of ESSs may be present, with each group of ESSs having a different battery chemistry.

The microgrid controller 110 may store in memory one or more setpoints received from an HMI (e.g., HMI 102). The one or more setpoints may include an activation minimum SOC setpoint, an energy capacity setpoint, a minimum energy content setpoint, and/or a minimum reserve requirement setpoint. Additionally, the microgrid controller 110 may store in memory a group rated capacity, an ECF, and/or an activation minimum SOC setpoint for each group of ESSs.

The microgrid controller 110 may perform one or more condition checks, such as a power capacity check, an energy calculation check, an SOC calculation check, an ESS reserve check, and/or a minimum time check, for determining an operating state of the group of FB energy resource systems 302. In some implementations, the microgrid controller 110 may perform the one or more condition checks for determining an operating state of a priority genset group. For example, the microgrid controller 110 may perform the SOC calculation check for determining the operating state of priority 2 genset group 302a.

In some implementations, the microgrid controller 110 may perform the SOC calculation check for determining the operating state of the group of FB energy resource systems 302 (or the operating state of priority 2 genset group 302a). The microgrid controller 110 may generate control signals for controlling the group of FB energy resource systems 302 based on the SOC calculation check. For the SOC calculation check, the microgrid controller 110 may measure an ESS group SOC of the group of ESSs 306, calculate, based on the load information, a total real power (e.g., in kilowatts (kW)) demanded by the loads 108, and determine an available real power (e.g., in kW) for the group of REB energy resource systems 304. In addition, the microgrid controller 110 may determine whether the available real power for the group of REB energy resource systems 304 is greater than a sum of the total real power demanded by the loads 108 and an ESS parasitic consumption of the group of ESSs 306. Based on the available real power being greater than the sum, the microgrid controller 110 may generate one or more first control signals (e.g., stop commands) for turning off the group of FB energy resource systems 302 or for maintaining the group of FB energy resource systems 302 in an off-state. In other words, the SOC calculation check may pass if the available real power for the group of REB energy resource systems 304 is greater than the sum of the total real power demanded by the loads 108 and the ESS parasitic consumption of the group of ESSs 306, which may be expressed by the conditions below:

IF renewable available real power>total real power+ΣESS Group RatedkW×ECF,
 THEN
 SOC calculation check=TRUE When the SOC calculation check is TRUE, the microgrid controller 110 may, based on the group of FB energy resource systems 302 being in an on-state, generate one or more stop control signals for turning off the group of FB energy resource systems 302.

The ESS parasitic consumption may include a group rated capacity (ESS Group RatedkW) of the group of ESSs 306, multiplied by the ECF for the group of ESSs 306. The ECF may be a self-consumption value for the group of ESSs 306 and may correspond to the battery chemistry of the group of ESSs 306. The ECF may be based on a parasitic load and an energy capacity of the group of ESSs 306.

In addition, the microgrid controller 110 may, based on the available real power being less than or equal to the sum (e.g., renewable available real power≤total real power+ΣESS Group RatedkW×ECF), generate one or more second control signals for turning on the group of FB energy resource systems 302 or for maintaining the group of FB energy resource systems 302 in an on-state. For example, the microgrid controller 110 may, based on the group of FB energy resource systems 302 being in the off-state, generate one or more start control signals for turning on the group of FB energy resource systems 302.

Based on the available real power being less than or equal to the sum (e.g., renewable available real power≤total real power+SESS Group RatedkW×ECF), the microgrid controller 110 may perform an evaluation based on the activation minimum SOC setpoint according to the conditions below:

ELSIF ESS group SOC[i]≥activation minimum SOC setpoint[i], THEN
 SOC calculation check=TRUE
 ELSE
 SOC calculation check=FALSE Accordingly, based on the available real power being less than or equal to the sum (e.g., renewable available real power≤total real power+ΣESS Group RatedkW×ECF), the microgrid controller 110 may determine whether the ESS group SOC of the group of ESSs 306 is equal to or greater than the activation minimum SOC setpoint for the group of ESSs 306. Based on the ESS group SOC being equal to or greater than the activation minimum SOC setpoint (e.g., SOC calculation check=TRUE), the microgrid controller 110 may generate the one or more first control signals for turning off the group of FB energy resource systems 302 or for maintaining the group of FB energy resource systems 302 in the off-state. On the other hand, based on the ESS group SOC being less than the activation minimum SOC setpoint (e.g., SOC calculation check=FALSE), the microgrid controller 110 may generate one or more second control signals for turning on the group of FB energy resource systems 302 or for maintaining the group of FB energy resource systems 302 in an on-state.

As described above, in some examples, a plurality of groups of ESSs may be present, with each group of ESSs having a different battery chemistry. Thus, the microgrid controller 110 may take into an account a sum of the ESS parasitic consumptions of the multiple groups of ESSs (e.g., ΣESS Group RatedkW×ECF) for performing the SOC calculation check. For example, the microgrid controller 110 may measure an ESS group SOC for each group of ESSs, calculate, based on the load information, the total real power demanded by the plurality of loads, determine the available real power for the group of REB energy resource systems, determine whether the available real power is greater than a sum of the total real power and a total ESS parasitic consumption of the plurality of groups of ESSs, and, based on the available real power being greater than the sum (e.g., Σrenewable available real power>total real power+ΣESS Group RatedkW×ECF), generate one or more first control signals for turning off the group of FB energy resource systems 302 or for maintaining the group of FB energy resource systems 302 in an off-state.

In addition, based on the available real power being less than or equal to the sum (e.g., Σrenewable available real power≤total real power+ΣESS Group RatedkW×ECF), the microgrid controller 110 may determine, for each group of ESSs, whether the ESS group SOC is equal to or greater than the respective activation minimum SOC setpoint (e.g., ESS group SOC[i]≥activation minimum SOC setpoint[i]). Based on the ESS group SOC being equal to or greater than the respective activation minimum SOC setpoint for all groups of the plurality of groups of ESSs, the microgrid controller 110 may generate the one or more first control signals for turning off the group of FB energy resource systems 302 or for maintaining the group of FB energy resource systems 302 in the off-state. Based on the ESS group SOC not being equal to or greater than the respective activation minimum SOC setpoint for all groups of the plurality of groups of ESSs, the microgrid controller 110 may generate one or more second control signals for turning on the group of FB energy resource systems 302 or for maintaining the group of FB energy resource systems 302 in an on-state. Thus, the SOC calculation check may be performed by the microgrid controller 110 according to the following conditions:

IF Σrenewable available real power>total real power+
        ΣESS Group RatedkW×ECF, THEN
        SOC calculation check=TRUE
    ELSIF ESS Group SOC[i]≥activation minimum SOC
        setpoint[i], THEN
        SOC calculation check=TRUE
    ELSE
        SOC calculation check=FALSE Additionally, or alternatively, the microgrid controller 110 may perform a power capacity check on the group of ESSs 306. Based on the power capacity check passing, the microgrid controller 110 may generate the one or more first control signals for turning off the group of FB energy resource systems 302 or for maintaining the group of FB energy resource systems 302 in the off-state, or, based on the power capacity check failing, the microgrid controller 110 may generate the one or more second control signals for turning on the group of FB energy resource systems 302 or for maintaining the group of FB energy resource systems 302 in an on-state. The microgrid controller 110 may perform the power capacity check by calculating a remaining load by subtracting a power capacity of the group of FB energy resource systems 302 and a power capacity of the group of REB energy resource systems 304 from the total real power, and comparing a discharge limit of the group of ESSs 306 to the remaining load. Based on the discharge limit being greater than the remaining load, the microgrid controller 110 may determine that the power capacity check passed. Based on the discharge limit not being greater than the remaining load, the microgrid controller 110 may determine that the power capacity check failed. Thus, the discharge limit of the group of ESSs 306 should be greater than the remaining load after subtracting the power of the group of REB energy resource systems 304 and the group of FB energy resource systems 302.

Additionally, or alternatively, the microgrid controller 110 may perform an energy calculation check on the group of ESSs 306. Based on the energy calculation check passing, the microgrid controller 110 may generate the one or more first control signals for turning off the group of FB energy resource systems 302 or for maintaining the group of FB energy resource systems 302 in the off-state, or, based on the energy calculation check failing, the microgrid controller 110 may generate the one or more second control signals for turning on the group of FB energy resource systems 302 or for maintaining the group of FB energy resource systems 302 in an on-state. The microgrid controller 110 may perform the energy calculation check by determining an energy content of the group of ESSs 306, and comparing the energy content to a minimum energy content setpoint. Based on the energy content being greater than the minimum energy content setpoint, the microgrid controller 110 may determine that the energy calculation check passed. Based on the energy content not being greater than the minimum energy content setpoint, the microgrid controller 110 may determine that the energy calculation check failed. The minimum energy content setpoint may be determined based on an ESS group rated power of the group of ESSs 306 and an amount of time (e.g., a start time) that the group of FB energy resource systems 302 takes to start from the off-state. A combination of the ESS group rated power and the start time provides the minimum energy content that the group of ESSs 306 must have before turning off the group of FB energy resource systems 302, as well as when the group of FB energy resource systems 302 should be started.

Additionally, or alternatively, the microgrid controller 110 may perform an ESS reserve check on the group of ESSs 306. Based on the ESS reserve check passing, the microgrid controller 110 may generate the one or more first control signals for turning off the group of FB energy resource systems 302 or for maintaining the group of FB energy resource systems 302 in the off-state, or, based on the ESS reserve check failing, the microgrid controller 110 may generate the one or more second control signals for turning on the group of FB energy resource systems 302 or for maintaining the group of FB energy resource systems 302 in an on-state. The microgrid controller 110 may perform the ESS reserve check by determining an amount of reserve power stored by the group of ESSs 306, and comparing the amount of reserve power to the minimum reserve requirement setpoint for the microgrid 300. Based on the amount of reserve power being greater than the minimum reserve requirement setpoint, the microgrid controller 110 may determine that the ESS reserve check passed. Based on the amount of reserve power being not greater than the minimum reserve requirement setpoint, the microgrid controller 110 may determine that the ESS reserve check failed. Thus, the group of ESSs 306 must have enough reserve power available to cover the minimum reserve requirement for the microgrid 300 before the group of FB energy resource systems 302 can be turned off.

Additionally, or alternatively, the microgrid controller 110 may perform a minimum time check corresponding to a minimum amount of time that the group of FB energy resource systems 302 are required to operate before being capable of being turned off. In other words, once the group of FB energy resource systems 302 are turned on, the group of FB energy resource systems 302 must remain on for the minimum amount of time before being capable of being turned off. Thus, even if all other condition checks pass (e.g., indicating that the group of FB energy resource systems 302 qualify for being turned off), the microgrid controller 110 may prevent the group of FB energy resource systems 302 from being turned off if the minimum amount of time has not lapsed. Thus, if the minimum time check fails, the microgrid controller 110 may maintain the group of FB energy resource systems 302 in the on-state. If the minimum time check passes, the microgrid controller 110 may permit the group of FB energy resource systems 302 to be turned off based on a required set of other condition checks (e.g., the power capacity check, the energy calculation check, the SOC calculation check, and/or the ESS reserve check) passing.

Figure 4:
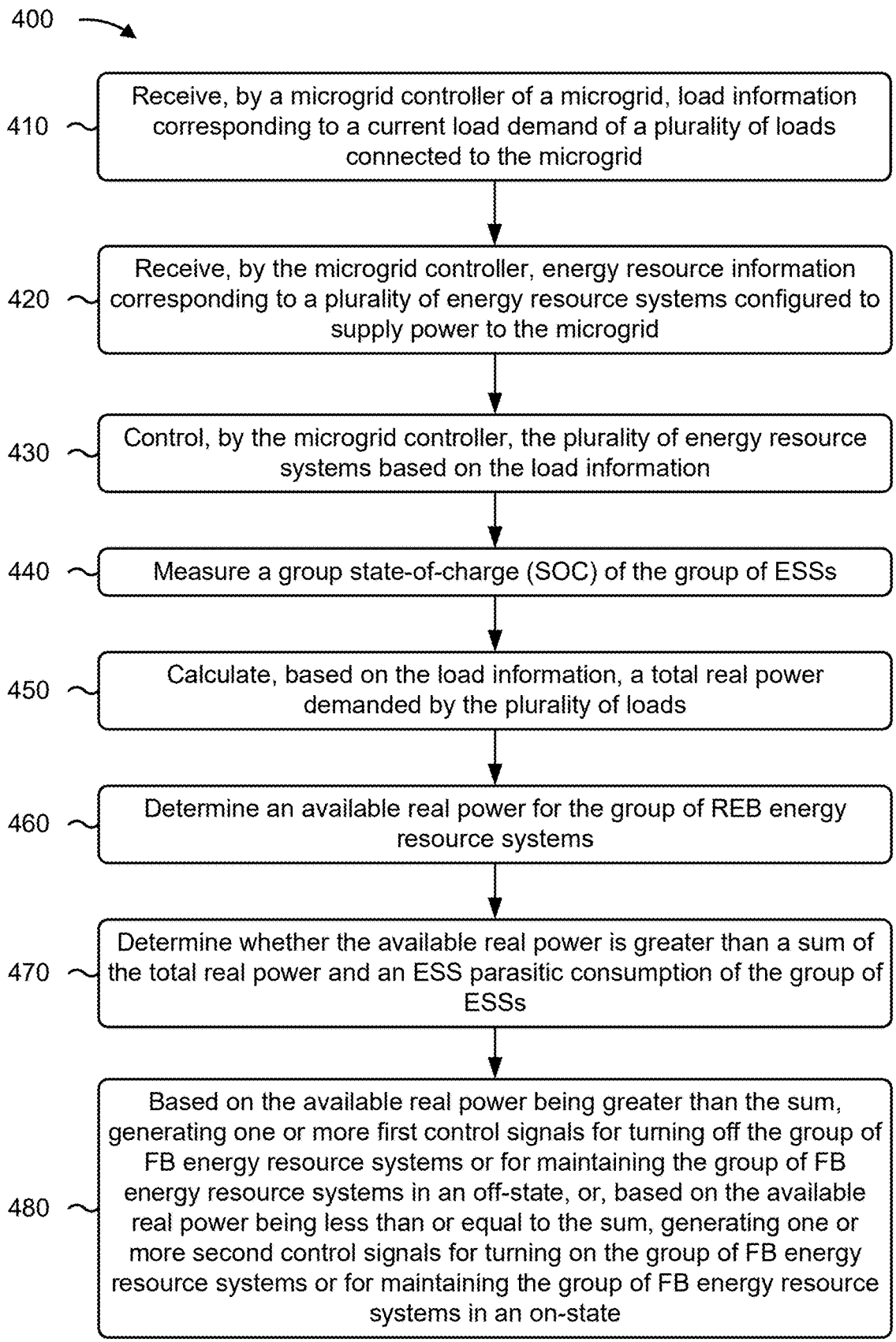
FIG. 4 is a flowchart of an example process associated with a microgrid configuration optimization for battery agnostic systems.

FIG. 4 is a flowchart of an example process 400 associated with a microgrid configuration optimization for battery agnostic systems. One or more process blocks of FIG. 4 may be performed by a microgrid controller (e.g., microgrid controller 110). Additionally, or alternatively, one or more process blocks of FIG. 4 may be performed by another device or a group of devices separate from or including the microgrid controller, such as another device or component that is internal or external to a microgrid.

As shown in FIG. 4, process 400 may include receiving load information corresponding to a current load demand of a plurality of loads connected to the microgrid (block 410).

As further shown in FIG. 4, process 400 may include receiving energy resource information corresponding to a plurality of energy resource systems configured to supply power to the microgrid (block 420).

As further shown in FIG. 4, process 400 may include controlling the plurality of energy resource systems based on the load information (block 430).

As further shown in FIG. 4, process 400 may include measuring a group SOC of the group of ESSs (block 440).

As further shown in FIG. 4, process 400 may include calculating, based on the load information, a total real power demanded by the plurality of loads (block 450).

As further shown in FIG. 4, process 400 may include determining an available real power for the group of REB energy resource systems (block 460).

As further shown in FIG. 4, process 400 may include determining whether the available real power is greater than a sum of the total real power and an ESS parasitic consumption of the group of ESSs (block 470).

As further shown in FIG. 4, process 400 may include, based on the available real power being greater than the sum, generating one or more first control signals for turning off the group of FB energy resource systems or for maintaining the group of FB energy resource systems in an off-state, or, based on the available real power being greater than the sum, generating one or more second control signals for turning on the group of FB energy resource systems or for maintaining the group of FB energy resource systems in an on-state (block 480).

In some implementations, controlling the plurality of energy resource systems further includes determining whether the group SOC is equal to or greater than an activation minimum SOC setpoint for the group of ESSs, and generating the one or more first control signals for turning off the group of FB energy resource systems or for maintaining the group of FB energy resource systems in the off-state, or generating one or more second control signals for turning on the group of FB energy resource systems or for maintaining the group of FB energy resource systems in an on-state.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram of example components of the microgrid controller 110 associated with a microgrid configuration optimization for battery agnostic systems. The microgrid controller 110 may include a bus 510, a processor 520, a memory 530, an input component 540, an output component 550, and/or a communication component 560.

The bus 510 may include one or more components that enable wired and/or wireless communication among the components of the microgrid controller 110. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus.

The processor 520 may include a central processing unit a microprocessor, a controller, a microcontroller, a digital signal processor, a field-programmable gate array, an application-specific integrated circuit, and/or another type of processing component. The processor 520 may be implemented in hardware, firmware, or a combination of hardware and software. The processor 520 may include one or more processors capable of being programmed to perform one or more operations or processes described elsewhere herein. For example, the processor 520 may perform one or more condition checks, such as the power capacity check, the energy calculation check, the SOC calculation check, the ESS reserve check, and/or the minimum time check, for regulating the operating state of a group of FB energy resource systems (e.g., group of FB energy resource systems 302 or priority 2 genset group 302a). The processor 520 may generate control signals based on the one or more condition checks for controlling the operating state of the group of FB energy resource systems.

The memory 530 may store information, one or more instructions, one or more setpoints, one or more ECFs, one or more capacity ratings, one or more power ratings, and/or software (e.g., one or more software applications) related to the operation of the microgrid controller 110. The memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the microgrid controller 110 to receive input, load information, generator data, energy storage data, status information, scheduling information, and/or control signals (e.g., control signals from a macrogrid controller). The output component 550 may enable the microgrid controller 110 to provide output, such as one or more control signals for controlling loads, energy storage systems, breakers, switches, and other components associated with the microgrid described herein. The communication component 560 may enable the microgrid controller 110 to communicate with other devices via a wired connection and/or a wireless connection. For example, the communication component 560 may include a receiver, a transmitter, and/or a transceiver.

The microgrid controller 110 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. Execution of the set of instructions, by one or more processors 520, may cause the one or more processors 520 and/or the microgrid controller 110 to perform one or more operations or processes described herein. Hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

INDUSTRIAL APPLICABILITY

A power distribution system, such as a microgrid, may include different types of DERs, including non-renewablefuel-based DERs (e.g., generator sets, some types of fuel cells, and other fuel-consuming DERs), renewable-energy-based DERs (e.g., wind, hydro, and solar), and energy storage systems (e.g., batteries and capacitors). A microgrid controller may provide an efficient way to optimize renewable-energy-based DERs, such that the microgrid controller has flexibility to turn on/off non-renewable-fuel-based DERs in order to maximize a usage of renewable-energy-based DERs. For example, the microgrid controller may turn on/off non-renewable-fuel-based DERs based on a real-time load and based on parasitics and energy capacities of the energy storage systems in order to optimize the usage of renewable-energy-based DERs. Accordingly, the non-renewable-fuel-based DERs may be used only when needed to support the loads in order to reduce an amount of consumable fuel that is used and to reduce an amount of pollutants released into the atmosphere. Thus, an amount of green energy generated by the renewable-energy-based DERs and used for supplying loads may be optimized.

What is claimed is:

1. A microgrid controller of a microgrid, comprising:
a communication interface configured to receive load information corresponding to a plurality of loads connected to the microgrid, receive energy resource information corresponding to a plurality of energy resource systems configured to supply power to the microgrid, and output control signals for controlling an operation of each energy resource system of the plurality of energy resource systems, wherein the plurality of energy resource systems includes a group of fuel-based (FB) energy resource systems, a group of renewable-energy-based (REB) energy resource systems, and a group of energy storage systems (ESSs) configured to be charged and discharged;
one or more memories configured to store an activation minimum state-of-charge (SOC) setpoint for the group of ESSs; and
one or more processors, coupled to the one or more memories, configured to:
measure a group SOC of the group of ESSs,
calculate, based on the load information, a total real power demanded by the plurality of loads,
determine an available real power for the group of REB energy resource systems,
determine whether the available real power is greater than a sum of the total real power and an ESS parasitic consumption of the group of ESSs, and
based on the available real power being greater than the sum, generate one or more first control signals for turning off the group of FB energy resource systems or for maintaining the group of FB energy resource systems in an off-state.

2. The microgrid controller of claim 1, wherein the one or more processors are configured to, based on the group of FB energy resource systems being in an on-state, generate one or more stop control signals for turning off the group of FB energy resource systems.

3. The microgrid controller of claim 1, wherein the one or more processors are configured to:
based on the available real power being less than or equal to the sum, generate one or more second control signals for turning on the group of FB energy resource systems or for maintaining the group of FB energy resource systems in an on-state.

4. The microgrid controller of claim 3, wherein the one or more processors are configured to, based on the group of FB energy resource systems being in the off-state, generate one or more start control signals for turning on the group of FB energy resource systems.

5. The microgrid controller of claim 1, wherein the one or more processors are configured to:
based on the available real power being less than or equal to the sum, determine whether the group SOC is equal to or greater than the activation minimum SOC setpoint, and
based on the group SOC being equal to or greater than the activation minimum SOC setpoint, generate the one or more first control signals for turning off the group of FB energy resource systems or for maintaining the group of FB energy resource systems in the off-state, or
based on the group SOC being less than the activation minimum SOC setpoint, generate one or more second control signals for turning on the group of FB energy resource systems or for maintaining the group of FB energy resource systems in an on-state.

6. The microgrid controller of claim 1, wherein the ESS parasitic consumption includes a group rated capacity of the group of ESSs multiplied by an energy capacity factor, wherein the energy capacity factor is greater than one.

7. The microgrid controller of claim 6, wherein the energy capacity factor is a self-consumption value for the group of ESSs.

8. The microgrid controller of claim 6, wherein the energy capacity factor corresponds to a battery chemistry of the group of ESSs.

9. The microgrid controller of claim 6, wherein the energy capacity factor is based on a parasitic load and an energy capacity of the group of ESSs.

10. The microgrid controller of claim 1, wherein each FB energy resource system of the one or more FB energy resource systems is a generator set, and
wherein each REB energy resource system of the one or more REB energy resource systems includes a wind turbine or a photovoltaic (PV) cell.

11. The microgrid controller of claim 1, wherein the one or more processors are configured to:
perform a power capacity check on the group of ESSs, and
based on the power capacity check passing, generate the one or more first control signals, or
based on the power capacity check failing, generate one or more second control signals for turning on the group of FB energy resource systems or for maintaining the group of FB energy resource systems in an on-state.

12. The microgrid controller of claim 11, wherein the one or more processors are configured to perform the power capacity check by:
calculating a remaining load by subtracting a power capacity of the group of FB energy resource systems and a power capacity of the group of REB energy resource systems from the total real power,
comparing a discharge limit of the group of ESSs to the remaining load, and
based on the discharge limit being greater than the remaining load, determining that the power capacity check passed, or
based on the discharge limit not being greater than the remaining load, determining that the power capacity check failed.

13. The microgrid controller of claim 1, wherein the one or more processors are configured to:

perform an energy calculation check on the group of ESSs, and
  based on the energy calculation check passing, generate the one or more first control signals, or
  based on the energy calculation check failing, generate one or more second control signals for turning on the group of FB energy resource systems or for maintaining the group of FB energy resource systems in an on-state.

14. The microgrid controller of claim 13, wherein the one or more processors are configured to perform the energy calculation check by:
  determining an energy content of the group of ESSs,
  comparing the energy content to a minimum energy content setpoint, and
    based on the energy content being greater than the minimum energy content setpoint, determining that the energy calculation check passed, or
    based on the energy content not being greater than the minimum energy content setpoint, determining that the energy calculation check failed,
  wherein the minimum energy content setpoint is determined based on a group rated power of the group of ESSs and an amount of time that the group of FB energy resource systems takes to start from the off-state.

15. The microgrid controller of claim 1, wherein the one or more processors are configured to:
  perform an ESS reserve check on the group of ESSs, and
    based on the ESS reserve check passing, generate the one or more first control signals, or
    based on the ESS reserve check failing, generate one or more second control signals for turning on the group of FB energy resource systems or for maintaining the group of FB energy resource systems in an on-state.

16. The microgrid controller of claim 15, wherein the one or more processors are configured to perform the ESS reserve check by:
  determining an amount of reserve power stored by the group of ESSs,
  comparing the amount of reserve power to a minimum reserve requirement setpoint for the microgrid, and
    based on the amount of reserve power being greater than the minimum reserve requirement setpoint, determining that the ESS reserve check passed, or
    based on the amount of reserve power being not greater than the minimum reserve requirement setpoint, determining that the ESS reserve check failed.

17. A microgrid controller of a microgrid, comprising:
  a communication interface configured to receive load information corresponding to a plurality of loads connected to the microgrid, receive energy resource information corresponding to a plurality of energy resource systems configured to supply power to the microgrid, and output control signals for controlling an operation of each energy resource system of the plurality of energy resource systems, wherein the plurality of energy resource systems includes a group of fuel-based (FB) energy resource systems, a group of renewable-energy-based (REB) energy resource systems, and a plurality of groups of energy storage systems (ESSs) configured to be charged and discharged;
  one or more memories configured to store a respective activation minimum state-of-charge (SOC) setpoint for each group of ESSs of the plurality of groups of ESSs; and
  one or more processors, coupled to the one or more memories, configured to:
    measure a group SOC for each group of ESSs,
    calculate, based on the load information, a total real power demanded by the plurality of loads,
    determine an available real power for the group of REB energy resource systems,
    determine whether the available real power is greater than a sum of the total real power and an ESS parasitic consumption of the plurality of groups of ESSs, and
    based on the available real power being greater than the sum, generate one or more first control signals for turning off the group of FB energy resource systems or for maintaining the group of FB energy resource systems in an off-state.

18. The microgrid controller of claim 17, wherein the one or more processors are configured to:
  based on the available real power being less than or equal to the sum, determine, for each group of ESSs whether the group SOC is equal to or greater than the respective activation minimum SOC setpoint, and
    based on the group SOC being equal to or greater than the respective activation minimum SOC setpoint for all groups of the plurality of groups of ESSs, generate the one or more first control signals for turning off the group of FB energy resource systems or for maintaining the group of FB energy resource systems in the off-state, and
    based on the group SOC not being equal to or greater than the respective activation minimum SOC setpoint for all groups of the plurality of groups of ESSs, generate one or more second control signals for turning on the group of FB energy resource systems or for maintaining the group of FB energy resource systems in an on-state.

19. A control method, comprising:
  receiving, by a microgrid controller of a microgrid, load information corresponding to a current load demand of a plurality of loads connected to the microgrid;
  receiving, by the microgrid controller, energy resource information corresponding to a plurality of energy resource systems configured to supply power to the microgrid, wherein the plurality of energy resource systems includes a group of fuel-based (FB) energy resource systems, a group of renewable-energy-based (REB) energy resource systems, and a group of energy storage systems (ESSs) configured to be charged and discharged; and
  controlling, by the microgrid controller, the plurality of energy resource systems based on the load information,
  wherein controlling the plurality of energy resource systems includes:
    measuring a group state-of-charge (SOC) of the group of ESSs,
    calculating, based on the load information, a total real power demanded by the plurality of loads,
    determining an available real power for the group of REB energy resource systems,
    determining whether the available real power is greater than a sum of the total real power and an ESS parasitic consumption of the group of ESSs, and
      based on the available real power being greater than the sum, generating one or more first control signals for turning off the group of FB energy resource systems or for maintaining the group of FB energy resource systems in an off-state, or based on the available real power being less than or equal to the sum, generating one or more second control signals for turning on the group of FB energy resource systems or for maintaining the group of FB energy resource systems in an on-state.

20. The control method of claim 19, wherein controlling the plurality of energy resource systems further includes:
based on the available real power being less than or equal to the sum, determining whether the group SOC is equal to or greater than an activation minimum SOC setpoint for the group of ESSs, and
based on the group SOC being equal to or greater than the activation minimum SOC setpoint, generating the one or more first control signals for turning off the group of FB energy resource systems or for maintaining the group of FB energy resource systems in the off-state, or
based on the group SOC being less than the activation minimum SOC setpoint, generating one or more second control signals for turning on the group of FB energy resource systems or for maintaining the group of FB energy resource systems in an on-state.

* * * * *